Figure 1:
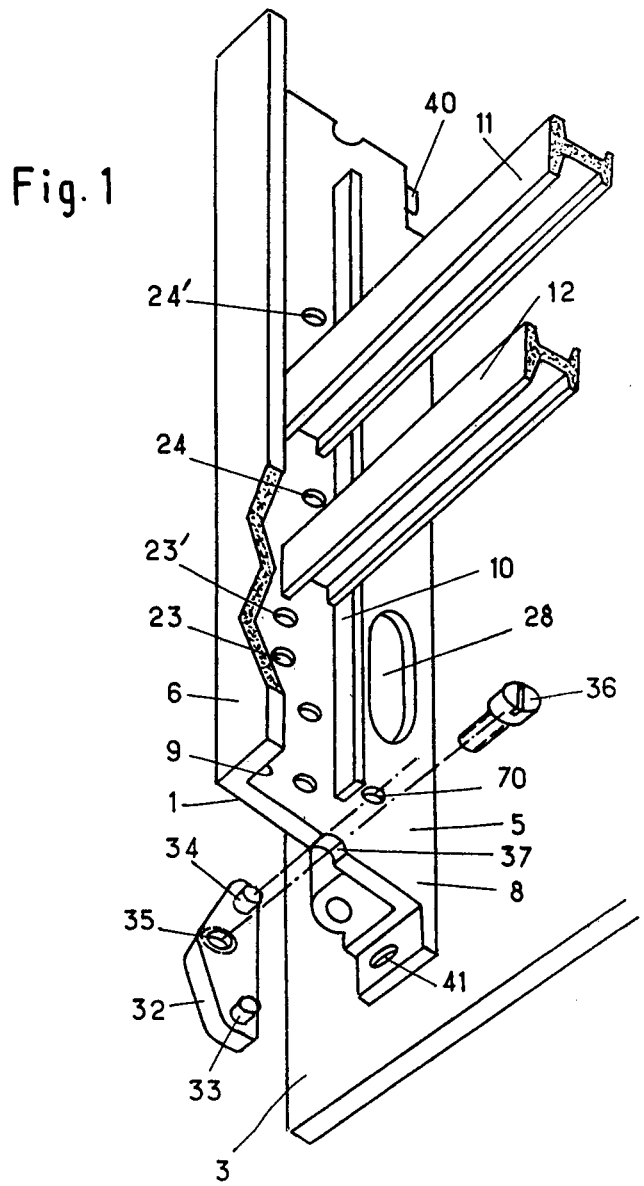

United States Patent [19]

Marcenne

[11] 4,236,641

[45] Dec. 2, 1980

[54] FRAME FOR SECURING ELECTRICAL, MECHANICAL OR PNEUMATIC DEVICES HAVING A BASE MEMBER FITTED WITH HOOKING MEANS

[75] Inventor: Jacques Marcenne, Poitiers, France

[73] Assignee: La Telemecanique Electrique, France

[21] Appl. No.: 886,506

[22] Filed: Mar. 14, 1978

[30] Foreign Application Priority Data

Mar. 14, 1977 [FR] France .............................. 77 07531

[51] Int. Cl.² .............................................. A47F 7/00
[52] U.S. Cl. ....................................... 211/87; 211/26; 248/310
[58] Field of Search .................. 211/26, 94, 94.5, 96, 211/103, 87, 89, 162; 248/16, 316 A, 310, 313; 52/664

[56] References Cited

U.S. PATENT DOCUMENTS 3,471,029  10/1969  Dolan .............................. 211/26 X

FOREIGN PATENT DOCUMENTS 1191180  4/1965  Fed. Rep. of Germany ........... 248/310

Primary Examiner—Roy D. Frazier
Assistant Examiner—Robert W. Gibson, Jr.
Attorney, Agent, or Firm—William A. Drucker

[57] ABSTRACT

Mounting for the fixing of equipment comprising a base plate equipped with means of hooking and ratching on flanges.

The mounting includes two parallel uprights whose facing surfaces are connected by a series of T-shaped cross-pieces, fixed in openings in said uprights, in accordance with specific rules of spacing.

6 Claims, 9 Drawing Figures

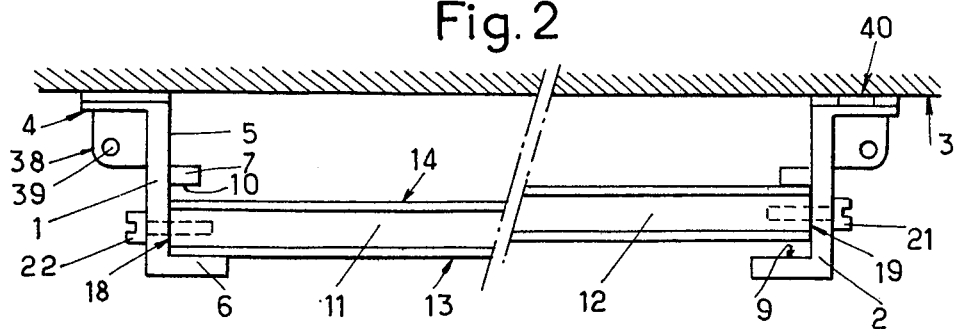
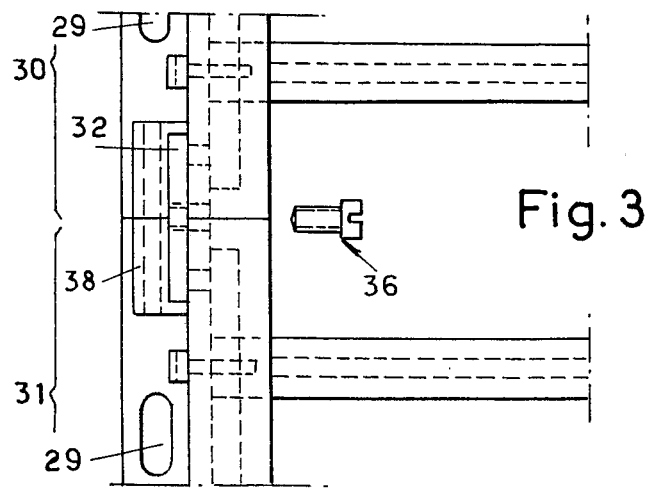
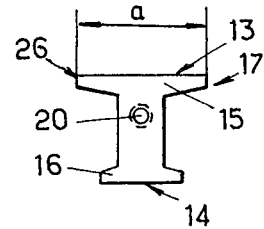

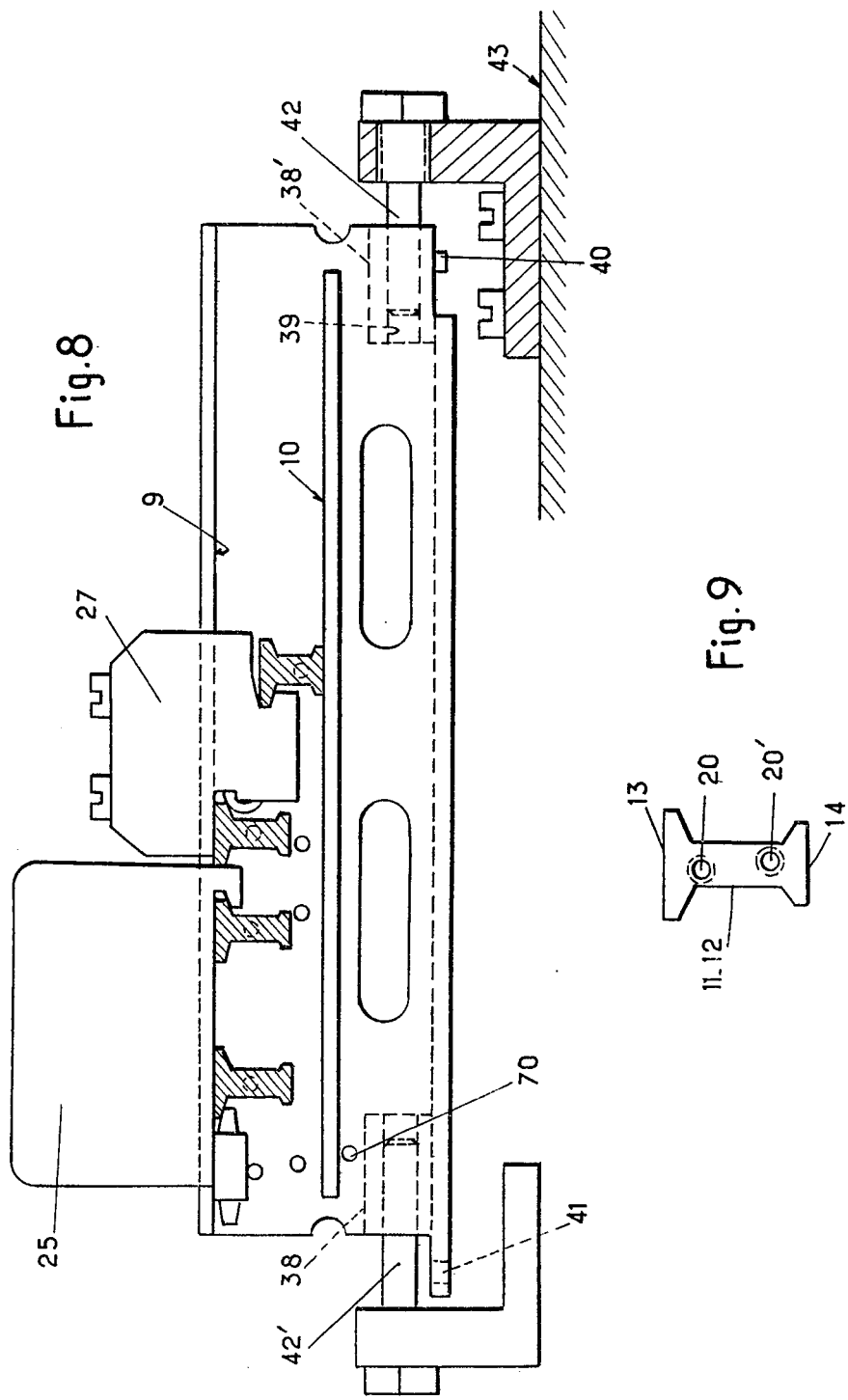

FRAME FOR SECURING ELECTRICAL, MECHANICAL OR PNEUMATIC DEVICES HAVING A BASE MEMBER FITTED WITH HOOKING MEANS

The invention relates to a mounting for fixing electrical, mechanical or pneumatic equipment in the form of boxes, the base plate of which is equipped with means of hooking on parallel edges, including two symmetrical lateral uprights fixed to a wall and receiving the perforated ends of parallel cross-pieces equipped with flanges.

In mountings of the prior art as defined above, the cross-pieces are, e.g., made in the form of flat metal bars held at the ends by screws fixed into series of threaded holes carried by two parallel uprights.

Such a construction neither gives the mounting sufficient rigidity before it is mounted on a wall nor gives the cross-pieces sufficient rigidity after mounting on said wall. Moreover, it is not possible with this form of embodiment to position two neighbouring cross-pieces at unequal distances from the wall so that their edges form the edges of a standardised C-shaped section.

Moreover, it has already been suggested that standardised C-shaped sections or Ω-shaped sections known as "cap sections" be mounted straight on to uprights; this latter solution, however, makes it necessary always to have a large quantity of sections available to make up mountings capable of taking equipment whose own fixing components are of different models.

The aim of the invention is therefore to provide a mounting made up of a small number of detachable elements, association of which will make it possible to form flanges placed at will at distances corresponding to those of the edges of standardised C-shaped sections or those of the edges of Ω-shaped "cap sections", while providing very good rigidity and geometric correction properties.

In an improved form of embodiment, the uprights will be designed also to make it possible to associate them end-to-end, and therefore to allow a mounting with a larger usable surface to be made up.

According to the invention, the aim sought is achieved by means of the fact that each cross-piece is a portion of section whose useful section is in the general shape of a T, whose opposite transversal faces each have at least one perforation parallel with the longitudinal direction of the section, while each upright includes a flat leg at right angles to said direction and two parallel wings pointing towards the other upright and placed at different distances from the wall, said leg being pierced by two sets of holes positioned in such a way that, when fixing elements are put through the first holes and into said perforations in the cross-pieces, the top surface of the cross-piece of the T is applied to the wing away from the wall, and when fixing elements are put into the second perforations, the base of the T is applied against by wing next to the wall.

Figure 5:
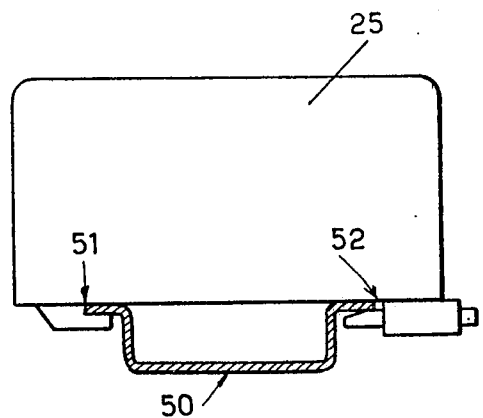
Figure 6:
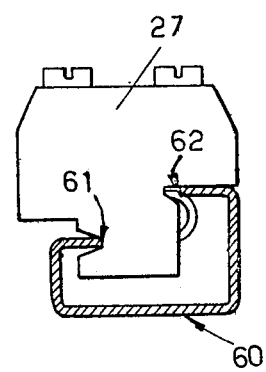
Figure 7:
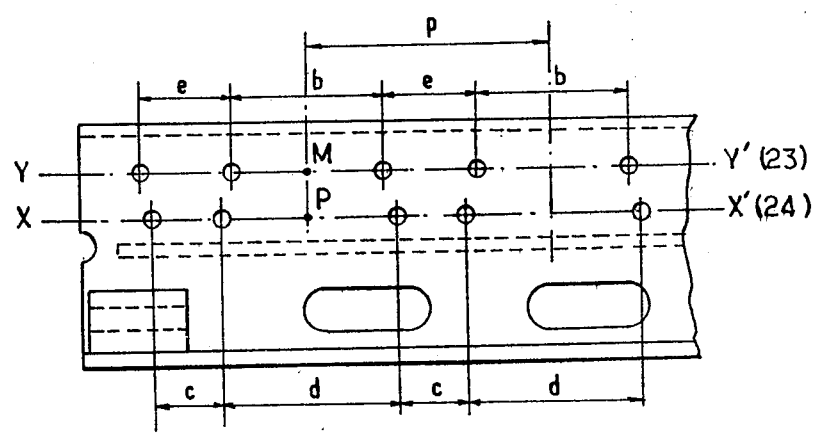

A better understanding of the invention will be obtained from a reading of the description gives below, which is accompanied by:

FIG. 1, which shows a perspective view of one side of the mounting, with the upright partially exploded, FIG. 2, which shows a view from above of a mounting in which, for the sake of clarity, only two half cross-pieces positioned at different levels have been shown, FIG. 3, which shows, seen from the front, the bottom of a first mounting, associated with the top of a second identical mounting, FIG. 4, where the preferred shape of the section of a cross-piece can be seen, FIG. 5, which shows a piece of equipment fixed on to a "cap section" by means of its hooking components, FIG. 6, which shows a different piece of equipment fixed on to a C-shaped section by means of its ratcheting components, FIG. 7, which shows a side view of an upright, FIG. 8, which illustrates a mounting hinged to the wall and FIG. 9 which illustrates a modified section of the cross-piece.

Upright 1 shown in FIG. 1 is one of two uprights 1, 2 positioned face to face and parallel on a wall 3 which can also be seen in FIG. 2.

Each of these uprights, e.g. upright 1, includes a base plate 4 for fixing to the wall and two wings 6, 7 positioned parallel to each other and parallel to wall 3, on the surface 8 of the leg 5 pointing towards the other upright 2.

Between the facing surfaces 8, there is a series of identical carrier rails or cross-pieces 11, 12 whose T-shaped section, which can be seen in FIG. 4, has two opposite parallel surfaces 13, 14 constiting respectively of the top surface of horizontal leg 15 and of the bottom surface of the foot 16 of the T.

Horizontal leg 15 is limited by two flanges 26, 17. The opposite transversal surfaces 18, 19 of a cross-piece are at right angles to the longitudinal direction of the section of the cross-piece and each has a threaded opening 20. The cross-pieces are associated to the uprights by screws 22, 21 each of which goes through one of the circular openings of a double set of openings 23, 23' . . . 24, 24' going through leg 5.

These sets of openings (see FIG. 7) are positioned at unequal intervals distributed alternately along two axes YY' XX' running parallel to the parallel facing surfaces 9 and 10, respectively belonging to wings 6 and 7, so that the centre point M between two openings in a set 23 is always opposite centre point P between two openings of the other set 24, MP being at right angles to (3).

When it is wished to make up a mounting in which flanges 26 or 17 of two neighbouring cross-pieces are the flanges of a standardised section termed a "cap section" 50 with flanges 51, 52, which can be seen in FIG. 5, the cross-pieces are positioned in such a way that their top surface 13 is in contact with surface 9 of wing 6, so that a series of parallel flanges is formed, positioned strictly in the same plane and at precise intervals determined by the spacing between the openings 23, 23', etc.

When it is wished to make up a mounting in which flanges 26 or 17 of two neighbouring cross-pieces are the flanges of a standardised C-shaped section 60 (which can be seen in FIG. 6), one cross-piece, e.g. cross-piece 11 (FIG. 1) is positioned as indicated above, while the other cross-piece is placed so that the bottom surface 14 of the foot is against the surface 10 of wing 7 and at a distance determined by the choice of one of the openings in set 24.

It is, of course, possible to combine in the same mounting cross-pieces which are the flanges of two standardised sections. The fixing of the side surfaces of the cross-pieces to the uprights with screws, as well as the cooperation of surfaces 13, 9 and 14, 10 respectively, gives the mounting excellent rigidity, even when it is not fixed to the wall, so that some pieces of equipment such as those shown at 25 and 27, FIGS. 5 and 6, can be mounted on it in advance.

Each upright moreover includes side openings 28, which can be seen in FIG. 1, in its leg 5 to allow conductors or flexible pipes to pass through, as well as fixing holes 29, which can be seen in FIG. 3, for fixing it to the wall.

When it is wished to make up a large mounting, the ends of the uprights of a first mounting 30 are aligned with the ends of the uprights of a second mounting 31, as can be seen in FIG. 3, and they are fixed together by means of ties 32 and screws 36 which can also be seen in FIG. 1.

Each of these ties has a threaded opening 35 and two nipples 33, 34 designed to fit into suitable openings 70; a half-moon shaped hollowed-out portion 37 made at the end of each upright allows the fixing screw 36 to to pass through. Complementary fixing and alignment between the two mountings are moreover provided by cooperation of nipple 40, see FIGS. 1 and 2, with housing 41, see FIG. 1. These two components are respectively positioned at the opposite ends of each upright, a single upright model advantageously obtained by moulding being used for uprights 1 and 2 by turning it over.

The rigidity of the mounting described above is such that it can also be used as a pivoting mounting. In order to allow a simple hinge to be formed, each end of the uprights has a bass 38, 38′, which can be seen in FIGS. 1, 2, 3, and 8 which is crossed by a bore 39, the axis of which is parallel to the plane of leg 5, so that by inserting hinge pins (42, 42′) fixed to the wall (43) as shown in FIG. 8 the required pivoting system can be obtained.

In the form of embodiment which has just been described, it was decided to position openings 23, 24 at intervals e, b and c, d respectively, successively alternated and selected so as to reconstitute flanges similar to those of C-shaped sections or "cap sections" on the one hand and, on the other hand, to provide an adequate space between two sets of pieces of equipment such as 25 and 27.

In an advantageous embodiment of the invention, the following relationship:

$$b/d = (35-a)(18+a)$$

was established between interval b, interval d and the width a separating the edges of the top cross-piece of the T forming the cross-pieces 11, 12, see FIG. 4.

It goes without saying that sections of different shapes can be used to make cross-pieces 11 and 12; these variants of shape naturally come within the context of the invention since they have at the top flanges such as 26 and 17, at the bottom a bearer surface such as 14 and at the top a bearer surface such as 13.

It must be clear that the form of embodiment illustrated in the figures is by no means limiting and that it would be possible to position two threaded openings such as (20 and 20′ FIG. 9) at the ends (18) and (19) of each cross-piece and their centres would conform to a law enabling surfaces (13) and (14) to be placed against surfaces (9) and (10) respectively to reconstitute flanges of "cap" or C-shaped sections, when fixing screws were inserted into a single set of openings, made in legs (5).

I claim:

1. A mounting for fixing electrical, mechanical or pneumatic equipment contained in boxes having base plates and means for hooking said base plates on carrier rails having parallel edges, said mounting including two uprights mounted on a wall, said carrier rails forming cross-pieces mounted parallel to each other between said two uprights, each cross-piece being a portion of section in the general shape of a T, having two end faces each having at least one perforation which is parallel to the longitudinal direction of the section, wherein each upright includes a plane leg at right angles to said direction and first and second parallel wings pointing towards the other upright and positioned at increasing distances from the wall, first and second sets of holes in said leg, the first and second sets of holes being respectively distributed on first and second lines arranged between the said first and second wings and parallel thereto, said lines of holes being so positioned that, when fixing parts are put through the holes of the first set and into the perforations of a cross-piece, the top surface of the said cross-piece is applied against the surface of the second wing and when the fixing parts are put into the holes of the second set and into the perforations of a cross-piece, the bottom surface of the base of the said cross-piece is applied against the surface of the first wing.

2. A mounting for fixing electrical, mechanical or pneumatic equipment contained in boxes, having base plates and means for hooking said base plates on carrier-rails having parallel edges, said mounting including two uprights mounted on a wall, said carrier rails forming cross-pieces mounted parallel to each other between said two uprights, each cross-piece being a portion of section in the general shape of a T, having two end faces, each having first and second perforations which are parallel to the longitudinal direction of the section, wherein each upright includes a plane leg at right angles to said direction and first and second parallel wings, pointing towards the other upright and positioned at increasing distances from the wall, a set of holes in said leg distributed on a line arranged between the said first and second wings and parallel thereto, said first perforations being so positioned that, when fixing parts are put through the holes and into the first and second perforations of a cross-piece, the top surface of the said cross-piece is applied against the surface of the second wing, and when the fixing parts are put into the holes and into the second perforations of a cross-piece, the bottom surface of the base of the said cross-piece is applied against the surface of the first wing.

3. A mounting for fixing electrical, mechanical or pneumatic equipment contained in boxes having base plates and means for hooking said base plates on carrier rails having parallel edges, said mounting including first and second assembled identical mounting units each comprising first and second uprights and carrier rails forming cross-pieces mounted parallel to each other between said first and second uprights, the first and second uprights of the respective mounting units being respectively aligned in end-to-end abutment and mounted on a common wall, each cross-piece being a portion of section in the general shape of a T having two end faces each having at least one perforation which is parallel to the longitudinal direction of the section, each upright including a plane leg at right angles to said direction and first and second parallel wing pointing towards the other upright of the respective mounting unit and positioned at increasing distances from the said common wall, first and second sets of holes in each leg, the first and second sets of holes being respectively distributed on first and second lines arranged between the said first and second wings and parallel thereto, said lines of holes being so positioned that, when fixing parts are put through the holes of the first set and into the perforations of a cross-piece, the top surface of the said cross-piece is applied against the surface of the second wing and when the fixing parts are put into the second holes and into the perforations of a cross-piece, the bottom surface of the base of the said cross-piece is applied against the surface of the first wing, a hollowed-out portion opening at an edge surface of each upright and a centring opening provided through the leg of each upright end surface, first and second coupling members each having first and second projecting portions and an aperture and respectively cooperating with the said first and second abutting uprights, the first and second projecting portions of each coupling member entering into the centring openings of the respective pairs of abutting uprights, and first and second fastening means engaging the hollowed-out portions of the respective pairs of abutting uprights.

4. A mounting for fixing electrical, mechanical or pneumatic equipment contained in boxes having base plates and means for hooking said base plates on carrier rails having parallel edges, said mounting including first and second assembled identical mounting units each comprising first and second uprights and carrier rails forming cross-pieces mounted parallel to each other between said first and second uprights, the first and second uprights of the respective mounting units being respectively aligned in end-to-end abutment and mounted on a common wall, each cross-piece being a portion of section in the general shape of a T having two end faces each having first and second perforations which are parallel to the longitudinal direction of the section, each upright including a plane leg at right angles to said direction and first and second parallel wings pointing towards the other upright of the respective mounting unit and positioned at increasing distances from the said common wall, a set of holes in each leg distributed on a line arranged between the said first and second wings and parallel thereto, said first perforations being so positioned that, when fixing parts are put through the holes and into the first and second perforations of a cross-piece, the top surface of the said cross-piece is applied against the surface of the second wing and when the fixing parts are put into the holes and into the second perforations of a cross-piece, the bottom surfaces of the base of the said cross-piece is applied against the surface of the first wing, a hollowed-out portion opening at an edge surface of each upright and a centring opening provided through the leg of each upright end surface, first and second coupling members each having first and second projecting portions and an aperture and respectively cooperating with the said first and second abutting uprights the first and second projecting portions of each coupling member entering into the centring openings of the respective abutting uprights and first and second fastening means engaging the hollowed-out portions of the respective pairs of abutting uprights.

5. A mounting as claimed in claim 1, said mounting further comprising first and second bosses integrally mounted at the respective ends of one upright, aligned bores provided in the respective bosses and hinge pins mounted on the wall and cooperating with said bores.

6. A mounting as claimed in claim 2, said mounting further comprising first and second bosses integrally mounted at the respective ends of one upright, aligned bores provided in the respective bosses and hinge pins mounted on the wall and cooperating with said bores.

* * * * *